United States Patent
Chua et al.

(10) Patent No.: US 8,389,896 B2
(45) Date of Patent: Mar. 5, 2013

(54) RAPID PROTOTYPING DEVICE AND METHOD WITH INDIRECT LASER EXPOSURE

(75) Inventors: Tze Peng Chua, Singapore (SG); Matthias Jorgas, Bocholt (DE); Harald Klemenz, Fürth (DE); Eng Cheong Lim, Singapore (SG); Pei Chyi Kristy Lim, Singapore (SG); Nisha Shakila Ma, Singapore (SG)

(73) Assignee: Siemens Medical Instruments Pte. Ltd., Singapore (SG)

( * ) Notice: Subject to any disclaimer, the term of this patent is extended or adjusted under 35 U.S.C. 154(b) by 361 days.

(21) Appl. No.: 12/707,818

(22) Filed: Feb. 18, 2010

(65) Prior Publication Data
US 2010/0224605 A1 Sep. 9, 2010

(30) Foreign Application Priority Data
Feb. 18, 2009 (DE) .......... 10 2009 009 503

(51) Int. Cl.
*B23K 26/00* (2006.01)
(52) U.S. Cl. .......... 219/121.85; 219/121.6; 219/121.61; 219/121.74; 219/121.75; 219/121.76
(58) Field of Classification Search .......... 219/121.85, 219/121.6, 121.61, 121.74, 121.75, 121.76
See application file for complete search history.

(56) References Cited

U.S. PATENT DOCUMENTS

| 5,578,227 | A |  | 11/1996 | Rabinovich |
| 5,965,043 | A | * | 10/1999 | Noddin et al. ........... 219/121.71 |
| 2004/0197737 | A1 |  | 10/2004 | Uckelmann et al. |
| 2006/0290772 | A1 | * | 12/2006 | Hwang et al. ................. 347/224 |
| 2009/0233257 | A1 | * | 9/2009 | Schmidt et al. ............. 433/201.1 |
| 2010/0206860 | A1 | * | 8/2010 | Chua et al. ............... 219/121.85 |

FOREIGN PATENT DOCUMENTS

| DE | 10106607 A1 | 9/2002 |
| EP | 1464298 A2 | 10/2004 |
| JP | 4241929 A | 8/1992 |
| JP | 6297168 A | 10/1994 |

* cited by examiner

*Primary Examiner* — Andy Huynh
(74) *Attorney, Agent, or Firm* — Laurence A. Greenberg; Werner H. Stemer; Ralph E. Locher

(57) ABSTRACT

It is desirable for the production of workpieces, which are sometimes produced by a rapid prototyping method, to be further automatable. To this end a device is provided having a laser for generating a laser beam in order to set a material, and a workpiece support which can be exposed directly to the laser. There is also provided an optical instrument for redirecting and deviating the laser beam so that the workpiece support can also be exposed indirectly to the laser. Material can therefore also be cured more easily in undercuts of workpiece blanks.

9 Claims, 1 Drawing Sheet

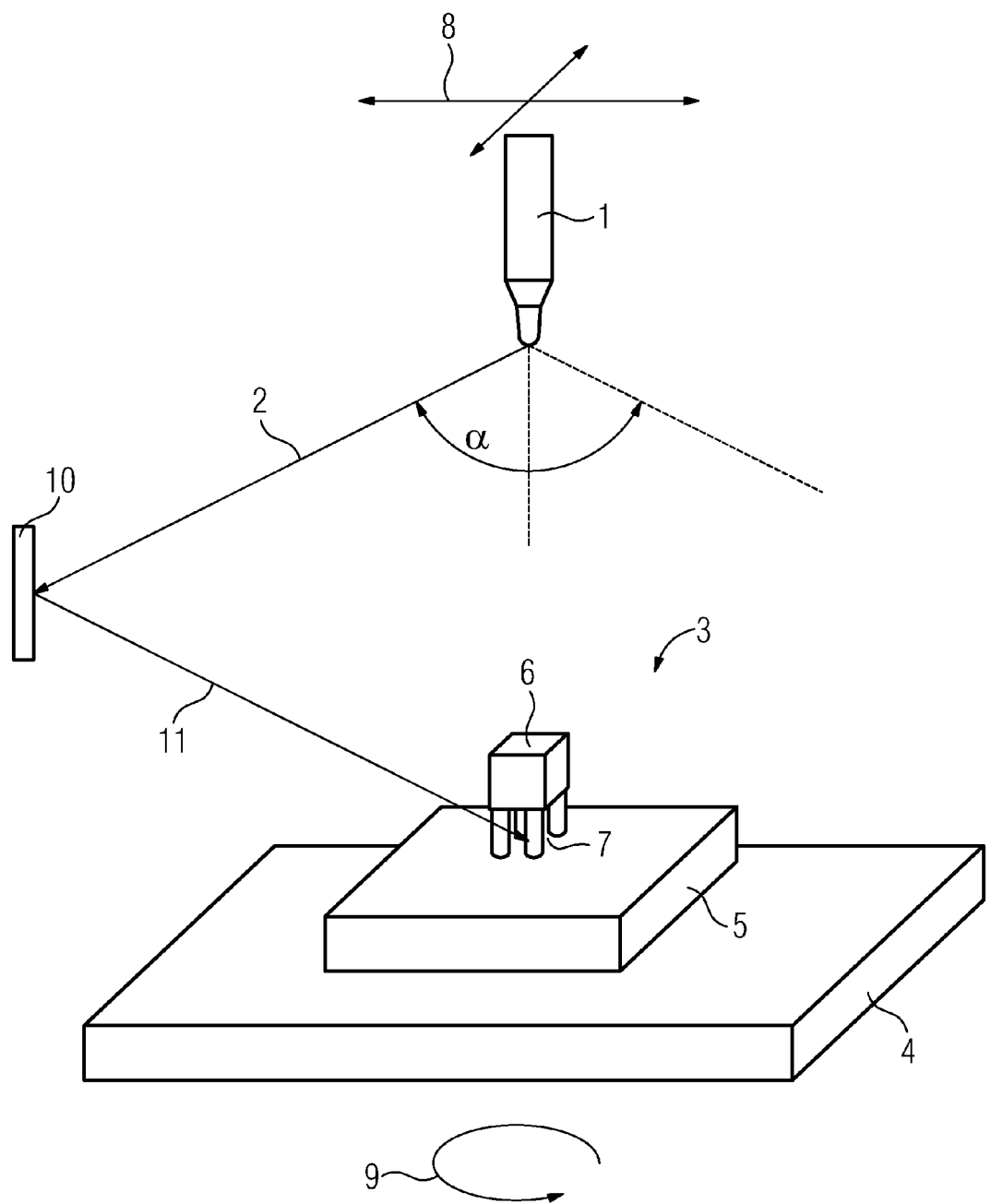

RAPID PROTOTYPING DEVICE AND METHOD WITH INDIRECT LASER EXPOSURE

CROSS-REFERENCE TO RELATED APPLICATION

This application claims the priority, under 35 U.S.C. §119, of German application DE 10 2009 009 503.9, filed Feb. 18, 2009; the prior application is herewith incorporated by reference in its entirety.

BACKGROUND OF THE INVENTION

Field of the Invention

The present invention relates to a device for producing a workpiece according to a rapid prototyping method. The device includes a laser for generating a laser beam in order to set a material, and a workpiece support which can be exposed directly to the laser from a predetermined solid angle range. The present invention furthermore relates to a rapid prototyping method for producing a workpiece by generating a laser beam, providing a workpiece support which can be exposed directly to the laser beam from a predetermined solid angle range, and setting a material on the workpiece support by using the laser beam.

The term "rapid prototyping" is intended to mean a method for rapidly producing specimen components from design data. In particular, it is thereby possible to obviate the use of molds which are elaborate to produce, such as for instance in the case of injection molding. Typical rapid prototyping methods are stereolithography (STL or STA) and selective laser sintering (SLS).

Stereolithography is a method in which a workpiece is built up layer-by-layer by materializing points. The fabrication of a part or a plurality of parts is typically carried out fully automatically from computer-generated CAD data. A light-curing plastic, for example epoxy resin, is in this case set in thin layers by a laser.

Selective laser sintering, on the other hand, is a method in which geometrical structures are produced from a starting material in powder form by sintering. It is likewise a generative layer construction method. By the effect of the laser beams, any desired three-dimensional geometries can thus be generated, even with undercuts which cannot be produced for example by conventional casting techniques. Thermoplastics in particular, for example polycarbonates, polyamides, polyvinyl chloride, but also metals, are used as materials.

If, prior to building up material by a rapid prototyping method, a workpiece blank already carries a component below which—in terms of exposure to the laser—there is a cavity which the laser cannot penetrate directly, then material cannot be built up in this cavity by the rapid prototyping method. In such cases, it is necessary to provide the workpiece blank initially without this component, subsequently build up the material by the rapid prototyping method, and finally apply the component—in general manually—onto the final rapid prototyping workpiece. Under certain circumstances, it is therefore necessary to avoid an automatic component application process or step by which the component is applied onto the workpiece or the workpiece blank.

SUMMARY OF THE INVENTION

It is accordingly an object of the invention to provide a a device and a method which overcome the above-mentioned disadvantages of the heretofore-known devices and methods of this general type and which provides for the production of workpieces, in which a rapid prototyping method is part of the production process, to be further automatable.

With the foregoing and other objects in view there is provided, in accordance with the invention, a device for producing a workpiece by a rapid prototyping process. The device comprises:

a laser for generating a laser beam configured to cure (set) a material;

a workpiece support disposed for direct exposure to the laser; and an optical instrument configured to redirect (deviate) the laser beam so as to also indirectly expose the workpiece support to the laser.

With the above and other objects in view there is also provided, in accordance with the invention, a rapid prototyping method for producing a workpiece by:

generating a laser beam;

providing a workpiece support which can be exposed directly to the laser beam; and setting a material on the workpiece support by using the laser beam; and deviating a laser beam so that the workpiece support can also be exposed indirectly to the laser beam.

For example, an automatically produced workpiece blank having undercuts can thus also be advantageously subjected subsequently to a rapid prototyping method in which material is built up in the undercut. This can be achieved owing to the fact that the laser beam is also deviated indirectly toward the workpiece by means of the optical instrument.

The optical instrument preferably comprises a mirror. Using a mirror, a laser beam can be redirected or deviated strongly so that even cavities which are difficult to access in a workpiece blank can be reached by the laser beam.

In a particular embodiment, the rapid prototyping method is a stereolithography method. In this way, a workpiece can be produced from a liquid duromer by laser curing.

As an alternative, the rapid prototyping method may also be selective laser sintering. In this case, for example, the workpiece may be produced from thermoplastics or a metal.

In accordance with a further embodiment of the invention, the workpiece support may carry a workpiece blank having a component below which (in terms of exposure to the laser) there is a cavity in which material is built up by setting the material by indirect exposure to the laser. This can open up the opportunity to initially apply the component automatically onto the workpiece blank without the material which will subsequently be built up by the rapid prototyping method. The component thus does not need to be applied by hand after the rapid prototyping method, when this can be done automatically beforehand. Standard components can thus be added to automatically before they are subjected to individualization by the rapid prototyping.

Other features which are considered as characteristic for the invention are set forth in the appended claims.

Although the invention is illustrated and described herein as embodied in a rapid prototyping device and method with indirect laser exposure, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The sole FIGURE of the drawing is an outline diagram of a rapid prototyping device according to the invention.

DETAILED DESCRIPTION OF THE INVENTION

Referring now to the FIGURE of the drawing in detail, there is shown an exemplary embodiment which, like the entire invention, relates to a rapid prototyping method in which a laser is used for setting or applying material. In particular, it should also be possible to apply a material individually in a rapid process onto a workpiece blank which has undercuts.

A rapid prototyping device suitable for this is represented schematically in the FIGURE. Only the primarily important components are depicted. These are firstly a laser 1, which is used to generate a laser beam 2. The intention is to expose a workpiece blank 3 which is placed on a workpiece support 4. The workpiece blank 3 is symbolized here by a plate 5 and a component 6 mounted on it. In terms of the "line of sight" of the laser 1, there is a cavity 7 underneath the component 6 since the component 6 is in this case mounted on legs on the plate 5.

In some rapid prototyping apparatus, the laser can be displaced relative to the workpiece or workpiece support 4 within certain limits according to the arrows 8 in a plane above the workpiece support 4. The laser can furthermore often be tilted in a predetermined solid angle range (symbolized here by the angle α). The workpiece support 4 can optionally also be rotated about its axis according to the arrow 9. With these degrees of freedom of the laser 1 relative to the workpiece or the workpiece support 4, however, in this case it is not possible for the undercuts of the workpiece blank 3 to be filled with material by a rapid prototyping method. Here, there would thus be undercuts which always lie in the shadow region of the laser 1.

According to the invention, provision is therefore made to deflect and deviate the laser beam 2 with the aid of a mirror 10 and thus expose the workpiece or the workpiece blank 3 indirectly to the laser light. It will readily be understood that the deviated laser beam 11 can penetrate very much further underneath the component 6 than the direct laser beam 2, which comes directly from the laser 1 whose movements are restricted. Therefore, although the workpiece support in the absence of the mirror 10 can be directly exposed to the laser only from a predetermined solid angle range, with the aid of the mirror 10 (if it is positioned suitably) the workpiece or the workpiece support 4 can also be exposed to the laser from an additional angle range which lies outside the predetermined solid angle range. The indirect exposure therefore increases the incidence range of the laser beam on the workpiece.

The mirror 10 may be replaced by any other desired optical instrument which deviates the laser beam. For example, the optical instrument may also be an arrangement of a plurality of mirrors. In addition, the mirror or mirrors may also be moved dynamically. Furthermore, the optical instrument may also comprise elements for refraction of light, for example a prism.

According to the present invention, workpiece blanks having undercuts can therefore be put into the rapid prototyping device and processed, even though they could not be processed by using conventional rapid processing devices owing to their undercuts. In the concrete example, material can now be applied on the plate 5 even after the component 6 has automatically been applied on the plate 5, even underneath the component 6, by a rapid prototyping methods such as for example stereolithography or selective laser sintering. Automatic application of the component 6 on the plate 5 does not therefore have to be avoided.

The invention claimed is:

1. A device for producing a workpiece by a rapid prototyping process, the device comprising:
   a laser for generating a laser beam configured to set a material;
   a workpiece support disposed for direct exposure to the laser beam, wherein said laser and said workpiece support are movable relative to one another to define a solid angle range within which said workpiece support is subject to direct exposure to the laser beam; and
   an optical instrument movably disposed relative to said workpiece support and configured to redirect the laser beam so as to indirectly expose said workpiece support to the laser beam and to increase an incidence range of the laser beam on the workpiece beyond the solid angle range of the direct exposure.

2. The device according to claim 1, wherein said optical instrument comprises a mirror.

3. The device according to claim 1, wherein the rapid prototyping process is a stereolithography method.

4. The device according to claim 1, wherein the rapid prototyping process is a selective laser sintering method.

5. A rapid prototyping method for producing a workpiece, the method which comprises:
   generating a laser beam with a laser;
   providing a workpiece support and placing the workpiece support for direct exposure to the laser beam;
   setting a material on the workpiece support by direct irradiation with the laser beam and thereby moving the laser and the workpiece support relative to one another and defining a solid angle range within which said workpiece support is subject to direct exposure to the laser beam; and
   deviating the laser beam for indirectly exposing the workpiece support to the laser beam and for increasing an incidence range of the laser beam on the workpiece beyond the solid angle range of the direct exposure.

6. The rapid prototyping method according to claim 5, which comprises deviating the laser beam by way of a mirror that is movably disposed relative to the workpiece support.

7. The rapid prototyping method according to claim 5, wherein the rapid prototyping method is a stereolithography method.

8. The rapid prototyping method according to claim 5, wherein the rapid prototyping method is a selective laser sintering method.

9. The rapid prototyping method according to claim 5, wherein the workpiece support carries a workpiece blank, and the workpiece blank has a component and a cavity below the component, and wherein the method comprises building up material in the cavity by setting the material with indirect exposure to the laser beam.

* * * * *